United States Patent [19]
Moore et al.
[11] Patent Number: 4,951,305
[45] Date of Patent: Aug. 21, 1990

[54] X-RAY GRID FOR MEDICAL RADIOGRAPHY AND METHOD OF MAKING AND USING SAME

[75] Inventors: William E. Moore, Macedon; David J. Steklenski, Rochester, both of N.Y.

[73] Assignee: Eastman Kodak Company, Rochester, N.Y.

[21] Appl. No.: 358,238

[22] Filed: May 30, 1989

[51] Int. Cl.[5] .......................... G21K 1/02; G21K 1/00; G02B 5/13

[52] U.S. Cl. .................................... 378/147; 378/145; 378/154; 378/169; 250/363.1; 250/505.1

[58] Field of Search ................. 378/154, 155, 156, 19, 378/160, 149, 34, 35, 147, 145, 149, 169; 250/505.1, 363.1

[56] References Cited

U.S. PATENT DOCUMENTS 1,476,048 12/1923 Bucky .
2,133,385 5/1937 Freeman .
2,605,427 7/1952 Delhumeau .
3,717,764 2/1973 Fujimura et al. .
3,869,615 3/1975 Hoover et al. ....................... 378/149
3,919,559 11/1975 Stevens .
3,953,303 4/1976 Kamada et al. .
4,414,679 11/1903 Liebert et al. .
4,536,882 8/1985 Jones et al. ........................... 378/35

FOREIGN PATENT DOCUMENTS 0926342 4/1955 Netherlands ........................ 378/154
0673661 6/1952 United Kingdom ................ 378/154

OTHER PUBLICATIONS

Phd Thesis, "Soft X-Rays " from California Institute of Technology, by John Charles Stevens.

*Primary Examiner*—Janice A. Howell
*Assistant Examiner*—Don Wong
*Attorney, Agent, or Firm*—Thomas H. Close

[57] ABSTRACT

A method of making a grid for x-ray radiography including the steps of forming grid patterns of x-ray opaque material on a plurality of sheets of x-ray transparent material, aligning the sheets in a stack, and bonding the sheets together to form a lightweight stacked grid.

24 Claims, 9 Drawing Sheets

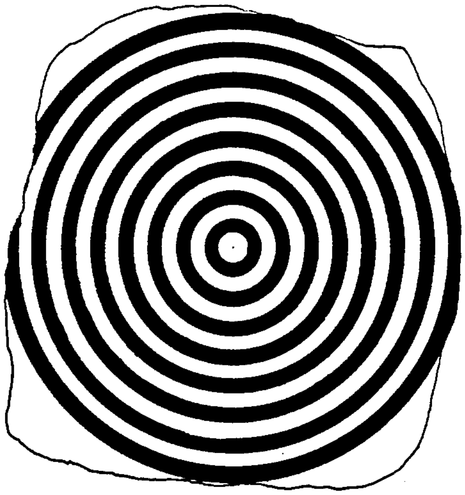
FIG. 6
FIG. 7
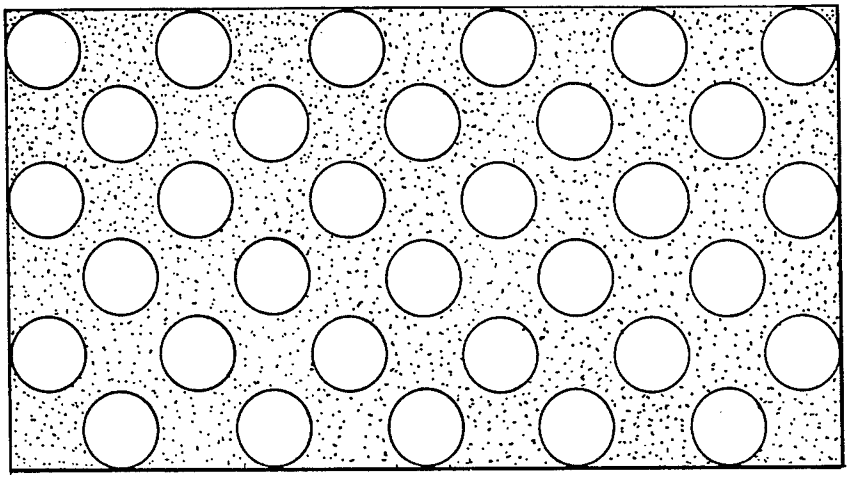

X-RAY GRID FOR MEDICAL RADIOGRAPHY AND METHOD OF MAKING AND USING SAME

TECHNICAL FIELD

The present invention relates to the field of medical radiography, and more particularly to a method of making an x-ray collimating grid for use in medical radiography, and to an x-ray grid produced by the method.

BACKGROUND ART

Scatter radiation is one of the most serious problems in radiography. It reduces subject contrast to as little as 10% of its intrinsic value and requires the use of high contrast x-ray photographic films with their concomitant exacting exposure and processing requirements.

Various methods currently exist to remove, or reduce, this scatter radiation. The most common is a mechanical system which "collimates" or reduces the acceptance angle of the detector to the scatter radiation. Conventional devices of this type (such as the slat grid, moving grids, or rotating apertures) are rather heavy. A grid, in fact, is often not used because it is too heavy to carry to the bedside for portable radiography. Conventional slat grids are made by alternating strips of lead foil with strips of aluminum or fiber. See U.S. Pat. No. 1,476,048 to Gustov Bucky issued Dec. 4, 1923. The aluminum or fiber "interspace material" is required to keep the lead foils separated and aligned. In addition to being heavy and fragile, fiber interspace grids are susceptible to humidity problems. Neither type (aluminum or fiber) can be repaired should they be accidentally dropped, and both types increase patient exposure due to the absorption of primary radiation by the interspace material.

A greatly enlarged cross sectional portion of a simple, conventional grid is schematically shown in FIG. 2. In the grid, x-ray opaque lead foil slats 10 alternate with filler strips 12 such as aluminum or fiber. The height of the grid is h, and the interspace width is d. The ratio $r = h/d$ is known as the grid ratio. In practice this ratio $h/d = 16/1$ is considered maximum. To achieve this ratio without reducing the transmission of the grid requires a large number of slats (i.e., a small value of d), since the available h is limited by the current use and design of x-ray equipment to values of about two millimeters.

The required large number of slats results in a grid that is very heavy. It is therefore an object of the present invention to provide a method and a grid for medical radiography that is lighter in weight than conventional grids.

Another type of grid, shown in U.S. Pat. No. 2,605,427 issued July 29, 1952 to Delhumeau is a two-dimensional focusing grid, so called because the slats are aligned with the rays coming from the x-ray source. Two-dimensional grids are nearly twice as heavy as one-dimensional grids due to the extra x-ray absorbent material.

It is therefore a further object of the invention to provide novel light weight two-dimensional grids and in particular, two-dimensional focusing grids.

In the prior art practice of bedside radiography where an x-ray cassette is slipped under a critically ill patient and an x-ray exposure is performed at the patient's bedside, grids were frequently not employed due to their bulk and difficulty of handling. The resulting exposures suffered due to scatter. Therefore, it is a still further object to provide a lightweight grid that can be incorporated into a standard x-ray cassette.

DISCLOSURE OF THE INVENTION

The above noted objects are achieved according to the present invention by forming a grid pattern of an x-ray opaque material on a sheet of x-ray transparent material and bonding a plurality of such sheets in a stack such that the grid patterns are in alignment resulting in a lightweight stacked grid. According to a further feature of the invention, the spacing between sheets is varied geometrically to further reduce the weight of the grid. The grid patterns may be formed on a plurality of sheets having the same thickness, and spacer sheets of different thickness, or different numbers of sheets of material of standard thickness employed to achieve the geometric spacing of the grid patterns. The grid patterns may also be formed on sheets of x-ray transparent material having different thicknesses to achieve the geometric spacings of the grid patterns.

In a preferred mode of practicing the invention, the x-ray opaque material is lead foil, the x-ray transparent material is polyester, and the lead foil is applied to the polyester material with adhesive and patterned by electrochemical etching. In one mode of practicing the invention, the lightweight stacked grid of the present invention is included in an x-ray cassette for bedside radiography. The x-ray cassette contains the grid and an x-ray sensor such as an x-ray film and intensifying screen, an x-ray photoconductor; a stimulable phosphor sheet or other x-ray detector.

BRIEF DESCRIPTION OF THE DRAWINGS

FIG. 6 is a schematic diagram of a further alternative pattern for a grid according to the present invention;

FIG. 7 is a schematic diagram of an alternative pattern into which the x-ray absorption material may be formed for use in the present invention;

MODES OF CARRYING OUT THE INVENTION

Figure 1:
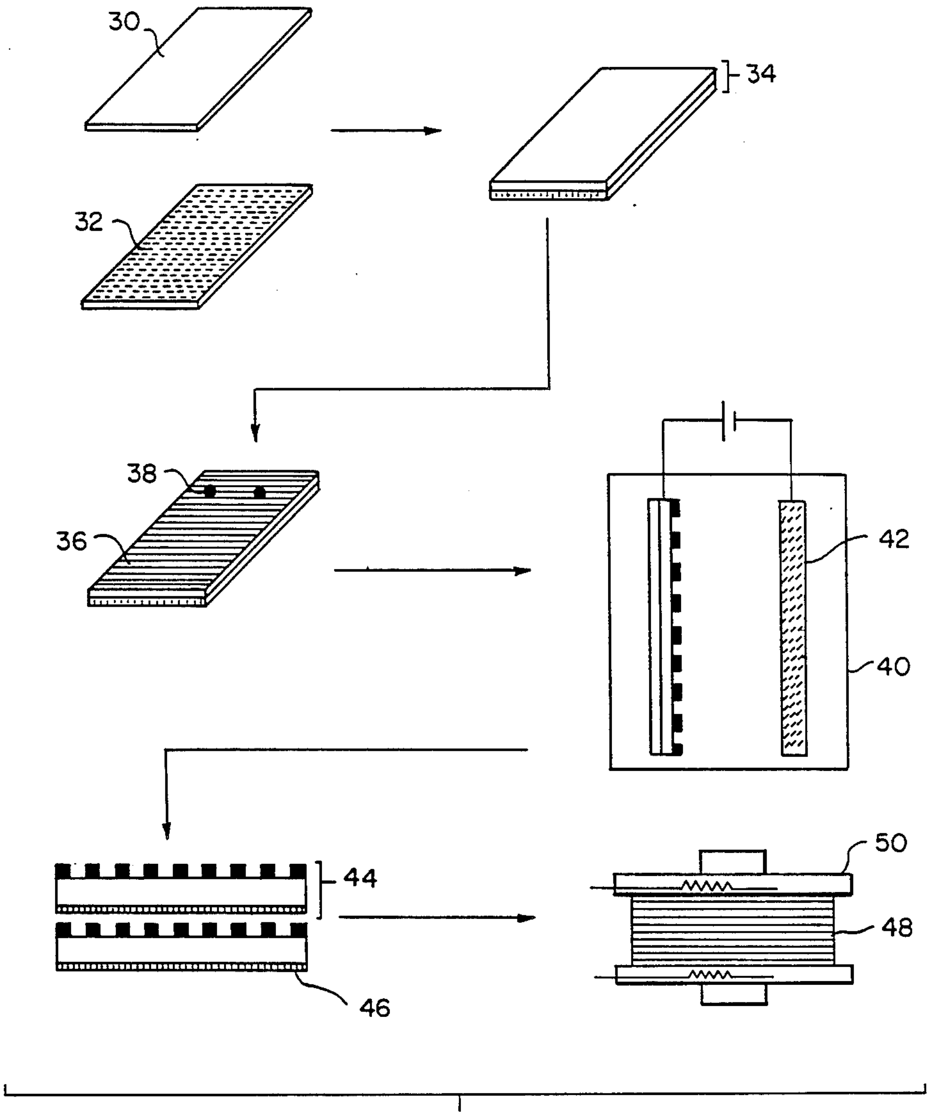
FIG. 1 is a schematic diagram showing the steps for practicing the method of the present invention.
Figure 2:
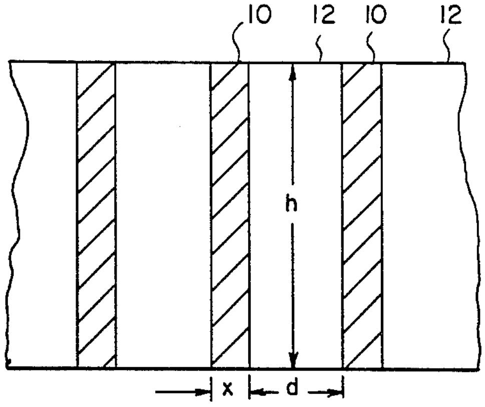
FIG. 2 (PRIOR ART)
FIG. 2 is a schematic diagram illustrating a partial cross-section of a prior art x-ray collimating grid of the type employed in medical radiography.

Referring now to FIG. 1, the method for making a stacked grid x-ray collimator for medical radiography will be described. First, a sheet of x-ray opaque material 30 (lead foil for example) of the desired thickness is adhered to a piece of x-ray transparent support 32 such as a polyester film through the use of a thin layer of a hot-melt or pressure sensitive adhesive. Onto the resulting assembly 34 is placed the desired pattern of grid lines 36 in the form of a polymeric coating. This pattern may be applied by many common methods such as through the use of photoresist technology, electrophotography, or lithographic printing. In addition to the grid pattern, may be printed registration marks 38 to aid in subsequent assembly. The resulting laminate is then electrochemically etched to remove the lead from the area not covered by the printed pattern. This is accomplished by immersing the laminate into a tank 40 containing a conductive, aqueous electrolyte (for example 1.25M KN03) and a metal counter electrode 42. As current is passed, the x-ray opaque lead passes into the electrolyte in the areas not covered by the printed mask. At the completion of the etching process, the patterned laminate 44 is coated with a thin layer of adhesive 46 and aligned with previously patterned sheets using the etched registration marks. The aligned stack 48 is then placed in a heated press 50 and sufficient heat and pressure applied to laminate the stack to form the stacked grid.

Figure 3:
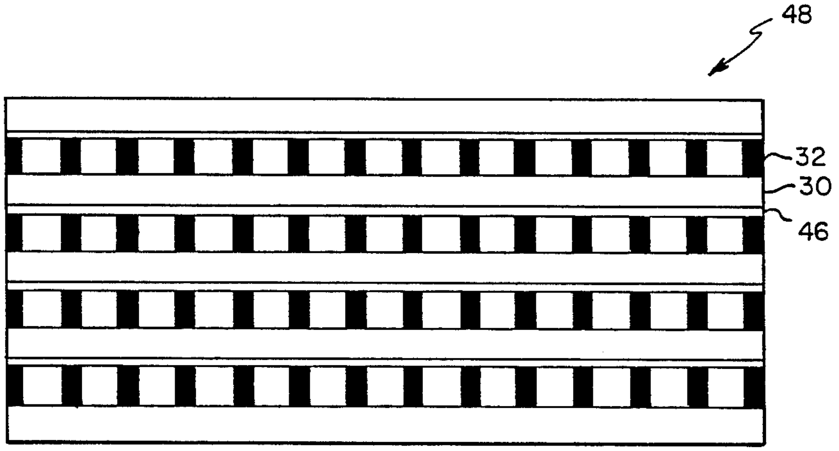
FIG. 3 is a schematic diagram illustrating a partial cross-section of a grid according to the present invention.

A 3.28 line per mm grid having a 6/1 grid ratio and suitable for medical radiography is manufactured as described above by etching a pattern of 0.10 mm wide lines spaced 0.20 mm apart into 0.02 mm thick sheet of lead foil supported on 2.5 mil (0.0635 mm) thick polyester sheet. The grid was made by stacking, in register, 12 sheets bearing the etched pattern and assembling them as described. The resulting grid weighs 2280 g/m2 vs a weight of 7400 g/m2 for a grid made by techniques in current practice. A partial cross section of the resulting stacked grid 48 is shown in FIG. 3.

The grid described above consists of a stack of sheets which are uniformly spaced. Alternatively, one can manufacture the grid with varying spacing between the layers of x-ray opaque material. The nonuniform spacing can be achieved through the use of different thickness of the x-ray transparent support 32 or may be built up using multiple sheets of standard thickness such as 1 mil, 2 mil, and 3 mil polyester. The optimum spacing for the grids is determined as follows, where t=the thickness of a grid on a sheet, x=the width of lines on a grid, and d=the distance between lines in a grid.

Figure 4:
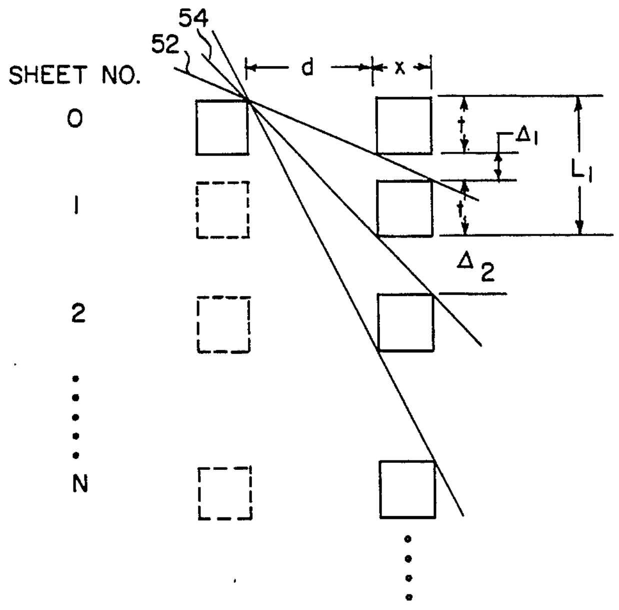
FIG. 4 is a schematic diagram useful in describing a stacked grid having geometrically spaced layers.

The first or top sheet is called sheet 0, the next sheet is called 1, and so on. The spacing between sheets varies geometrically, with the spacing between sheet i-1 and i being called $\Delta_i$. The overall height of n+1 sheets is $h=L_n$. FIG. 4 illustrates the critical rays which must be stopped to determine the location of the successive sheets with respect to sheet number 0. By simple geometry, it is seen that to stop the critical ray labeled 52, sheet number 1 must be positioned such that $$\Delta_1 \leqq \frac{xt}{d} \tag{1}$$

Similarly, to stop critical ray 54, sheet number 2 must be positioned such that $$\Delta_2 \leqq \frac{xL_1}{d}, \tag{2}$$

and in general, $$\Delta_i \leqq \frac{x(L_{i-1})}{d}, \tag{3}$$

where $L_1=2t+\Delta_1$ and $L_i=L_{i-1}+t+\Delta_i$.

To collimate to the small angle $\theta=d/h$, i.e., for this system to have the same grid ratio as the simple system $$h = L_n = \frac{d}{\theta}. \tag{4}$$

One can calculate the number of sheets n+1, to achieve this result. In general, the thickness of n+1 sheets is given by:

$$L_n \leqq t \cdot \sum_{q=0}^{n} s^q \tag{5}$$

where $$s = 1 + \frac{x}{d}. \tag{6}$$

But, $$\sum_{q=0}^{n} s^q = \frac{1}{s-1}(s^{n+1}-1), \tag{7}$$

by definition of a geometric progression,

, by definition of a geometric progression, and $$h = L_n = \frac{d}{\theta}, \text{ by adopted constraint.} \tag{8}$$

, by adopted constraint.

Thus, $$\frac{d}{\theta} \leqq t \cdot (s^{n+1}-1)/(s-1) \tag{9}$$

or $$\frac{d}{\theta t}(s-1) + 1 \leqq s^{n+1} \tag{10}$$

Taking natural logarithms, we find that to achieve a given grid ratio (h/d) using a given set of parameters x and t, we need a height $L_n$, and at least n+1 sheets, with $$n + 1 \geqq \frac{\ln\left(\frac{xh}{td} + 1\right)}{\ln\left(\frac{x}{d} + 1\right)}. \quad (11)$$

Although the preceeding method of calculating layer spacings is one way of obtaining useful values, other methods of obtaining geometric spacings are possible. For example, a desired $\Delta_1$ can be specified, and equation (3) above used to calculate the other spacings. This approach allows one to reduce the number of layers in the grid.

A 6.25 line per mm grid having a 16/1 grid ratio suitable for medical radiography, is manufactured as described above by forming 0.08 mm thick lines, 0.04 mm wide and spaced apart by 0.12 mm on 1 ml (25 μm) polyester film base, and using eight sheets spaced as follows:

| Layer No. | $\Delta_i$ mm | $L_i$ mm |
|---|---|---|
| 0 | 0 | 0 |
| 1 | <.026 | .186 |
| 2 | <.062 | .328 |
| 3 | <.109 | .517 |
| 4 | <.173 | .771 |
| 5 | <.257 | 1.108 |
| 6 | <.369 | 1.558 |
| 7 | <.519 | 2.157 |

The spacing can be achieved by sheets of polyester that are formed to the desired thickness (i.e. $\Delta_i$ minus the thickness of the base that the sheets are formed on). An approximation of these spacings may be built up from multiple sheets of standard thickness such as 1 mil, 1.5 mil or 2 mil polyester sheets.

Figure 5:
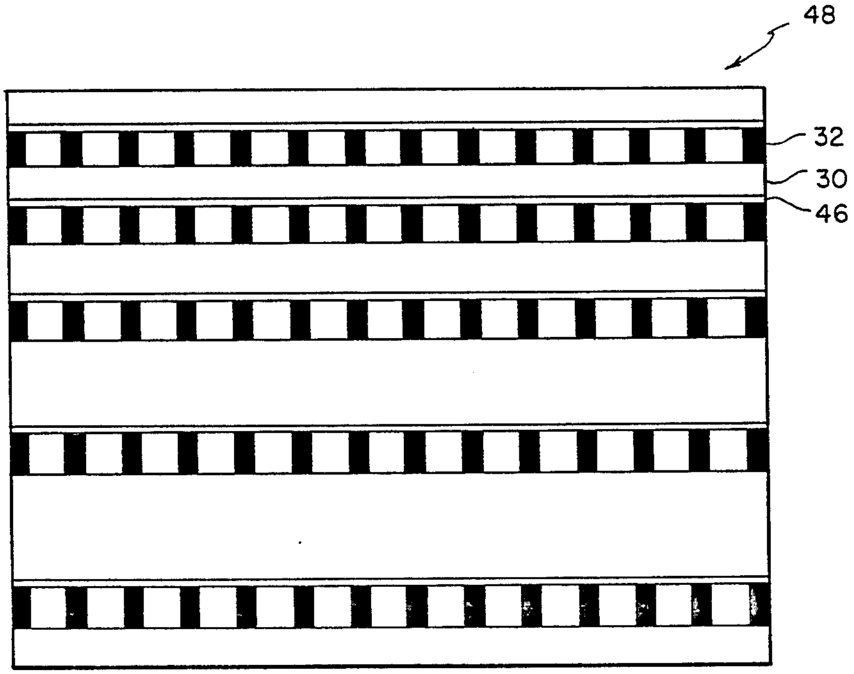
FIG. 5 is a schematic diagram illustrating a partial cross section of a grid having geometrically spaced layers.

A portion of a stacked grid having geometrically spaced sheets is shown schematically in FIG. 5.

In the mode of practicing the invention described above, the sheets bearing the etched grid patterns were aligned mechanically using the registration marks. Alternatively, in the case that the sheets and the spacers are also transparent, the sheets may be aligned by optical means.

Furthermore, since the grid is light weight and inexpensive one side of the grid, the side facing the film, may be coated with phosphor and used as the front screen in a standard x-ray cassette.

The grid described above is similar in thickness and spacing to the high line density grids (ca 6 line/mm) conventionally employed in medical radiography. This high line/mm frequency causes the image of the grid in the radiograph to be almost invisible, due to the human eye's poor response at these high spatial frequencies.

It will be appreciated that lower grid ratios are easily achieved through the use of fewer layers, resulting in a thinner grid of the same high line number. Lower grid ratios are also achieved through the use of thicker and wider grid patterns, together with fewer layers resulting in a grid of lower line number, but the same thickness. It will also be appreciated that crossed grids may be constructed for collimating x-rays in two directions by forming sheets which have grid patterns in two directions.

Although traditional grid geometry is an array of lines, the technique of the present invention enables unconventional geometry to be realized as easily as the traditional line pattern. Some possibilities include two-dimensional collimating grids composed of concentric circles, rectangles, triangles, ellipsoids, and arrays of circular or other shaped apertures arranged in rectangular or concentric arrays. FIG. 6 is a schematic diagram of a portion of a two-dimensional collimating grid pattern composed of concentric circles. FIG. 7 is a schematic diagram of a portion of two-dimensional collimating grid pattern composed of an array of circular apertures arranged in a rectangular pattern.

Although the grid lines have been shown as having a rectangular cross section, it will be appreciated that variations from a rectangular cross section such as trapezoidal or half cylinder cross sections can be tolerated while achieving the meritorious effects of the invention.

Although the practice described above consists of using polymeric materials such as polyester or polyolefin sheets to support the x-ray opaque material, other materials such as sheet aluminum could serve as well. In this case one might want to etch both the x-ray opaque material and its support as well.

Many other methods could be used to form the x-ray opaque patterns of this invention. The desired pattern can be made using an ink or dispersion containing such x-ray opaque materials as lead, tin, uranium, or gold. This can be done by standard printing techniques such as gravure or offset printing. Alternatively, the desired pattern can be printed using electrophotographic techniques employing a toner containing the x-ray opaque material. Another useful method employs technology commonly used in the printed circuit industry. A thin layer of a conductive material, commonly copper, is evaporated onto the x-ray transparent support and printed with the desired pattern. The x-ray opaque material is then electroplated onto the exposed conductive material. All of the above mentioned methods provide sheets of x-ray transparent material bearing an x-ray opaque pattern which can be subsequently aligned and assembled to form grids suitable for medical radiography which demonstrate the weight saving and flexibility improvements of this invention.

Likewise, although the practice of the invention described above describes the use of a lead foil as the x-ray opaque material, if other opaque materials were to be applied by some of the alternate techniques suggested involving inks or dispersions, such materials as finely divided lead, tin, uranium, gold, and other common x-ray absorbing materials would be useful.

Figure 8:
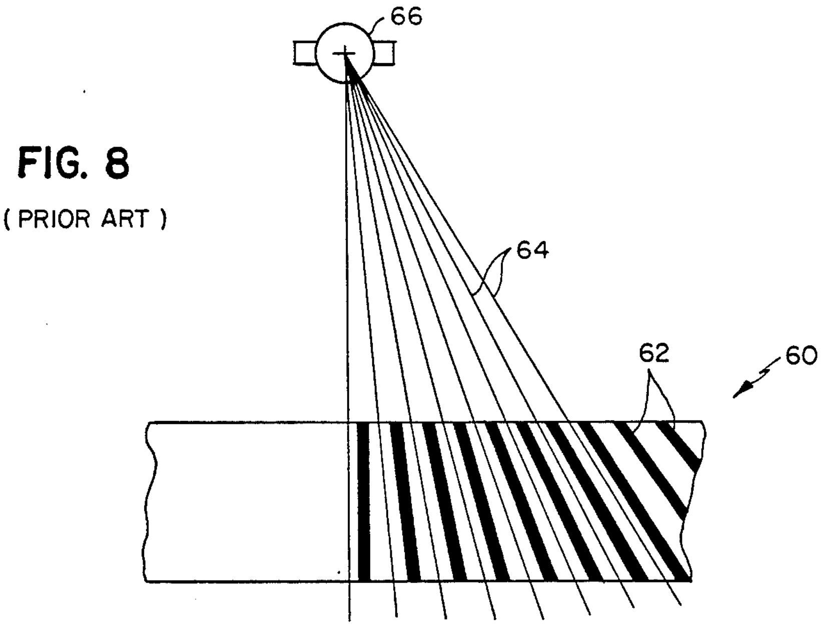
FIG. 8 (PRIOR ART)
FIG. 8 is a schematic diagram illustrating a partial cross section of a focused grid according to the prior art.
Figure 9:
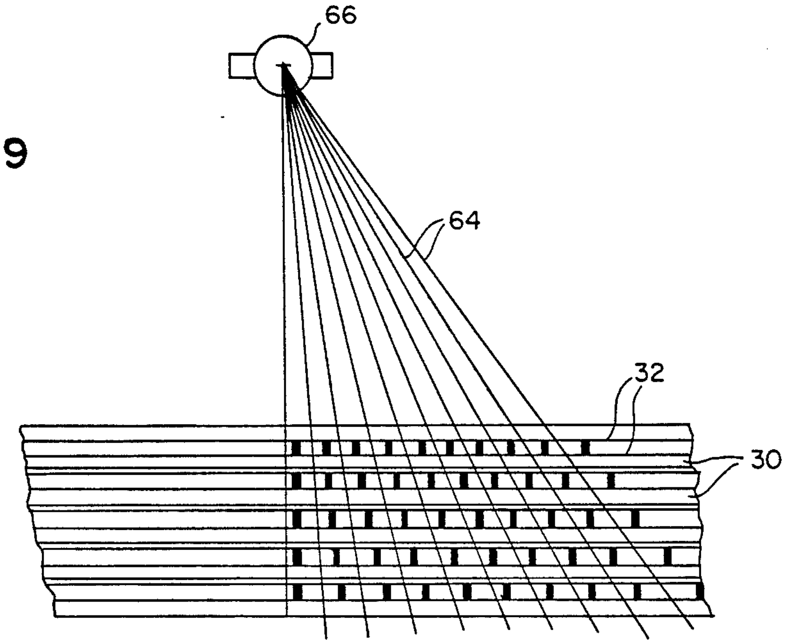
FIG. 9 is a schematic diagram illustrating a partial cross section of a focused grid according to the present invention.
Figure 10:
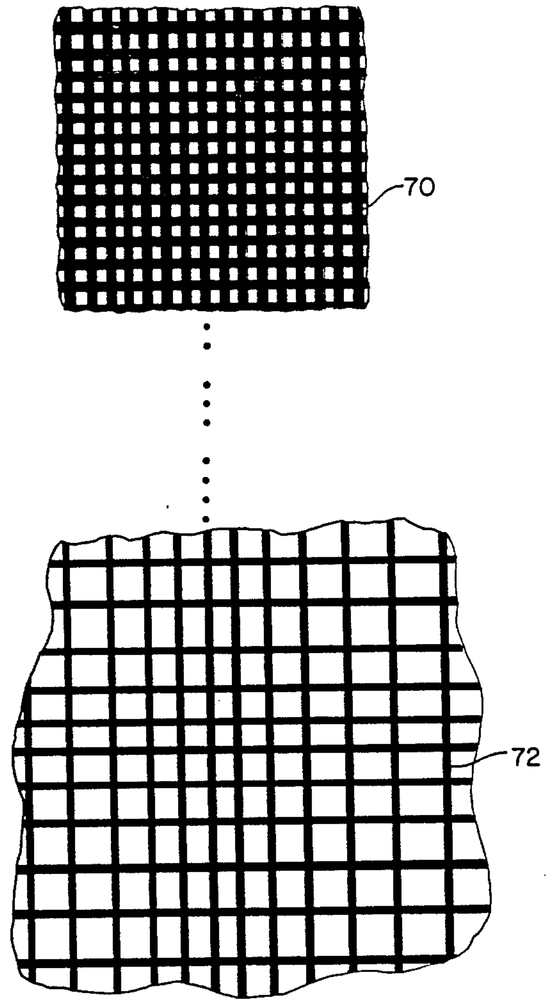
FIG. 10 is a schematic diagram of the construction of a rectangular two-dimensional, integral focused grid made possible and constructed by means of the practice of this invention.
Figure 11:
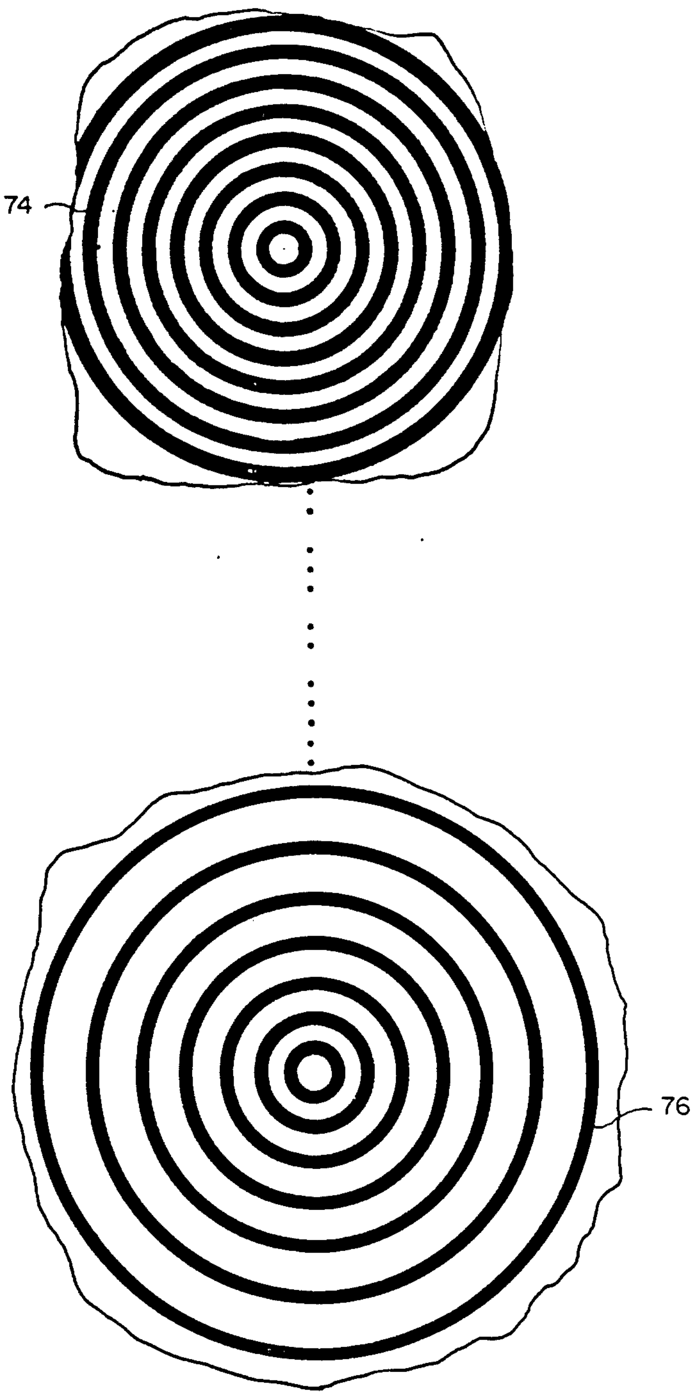
FIG. 11 is a schematic diagram of a radially symmetrical, two-dimensional, integral, focused grid made using the practice of this invention.

The methods employed in carrying out this invention also lend themselves to the preparation of focused grids. As illustrated in FIG. 8 which shows a partial cross section of a prior art focused grid 60, the x-ray opaque slats 62 in the grid are aligned with the rays 64 from an x-ray source 66. Such as grid is designed to be used at a particular distance from an x-ray source, with the source generally centered on the grid. FIG. 9 is a schematic diagram illustrating a portion of a stacked focused grid according to the present invention. In this case the patterns of the x-ray opaque material 32 which are etched or printed onto the support 30 are not identical from layer to layer but vary in spacing to align the x-ray transparent paths through the grid with the rays coming from a point source 66 of x-rays 64. A particular advantage of this invention is that it allows for the preparation of integral, two-dimensional focused grids as illustrated in FIGS. 10 and 11. In this case, the pattern varies in both the length and width dimensions in the separate layers of the assembled grid.

FIG. 10 shows a portion of the pattern on the top sheet 70, and the $n^{th}$ sheet 72 of a rectangular two-dimensional focused grid. FIG. 11 shows a portion of the pattern on the top sheet 74 and the $n^{th}$ sheet 76 of a radially symmetrical two-dimensional focused grid of concentrix rings.

Figure 12:
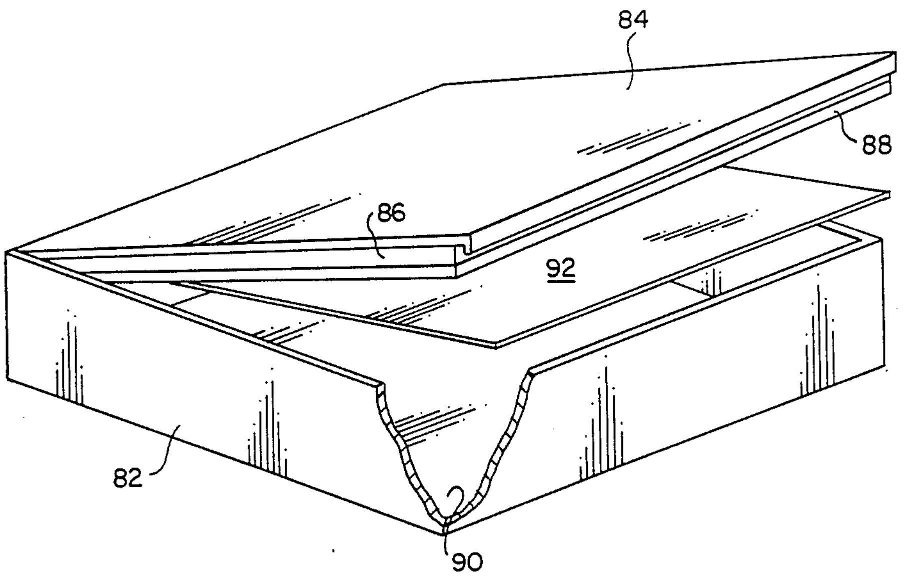
FIG. 12 is a schematic diagram of an x-ray cassette into which has been built the assembled, lightweight grid of this invention.
Figure 13:
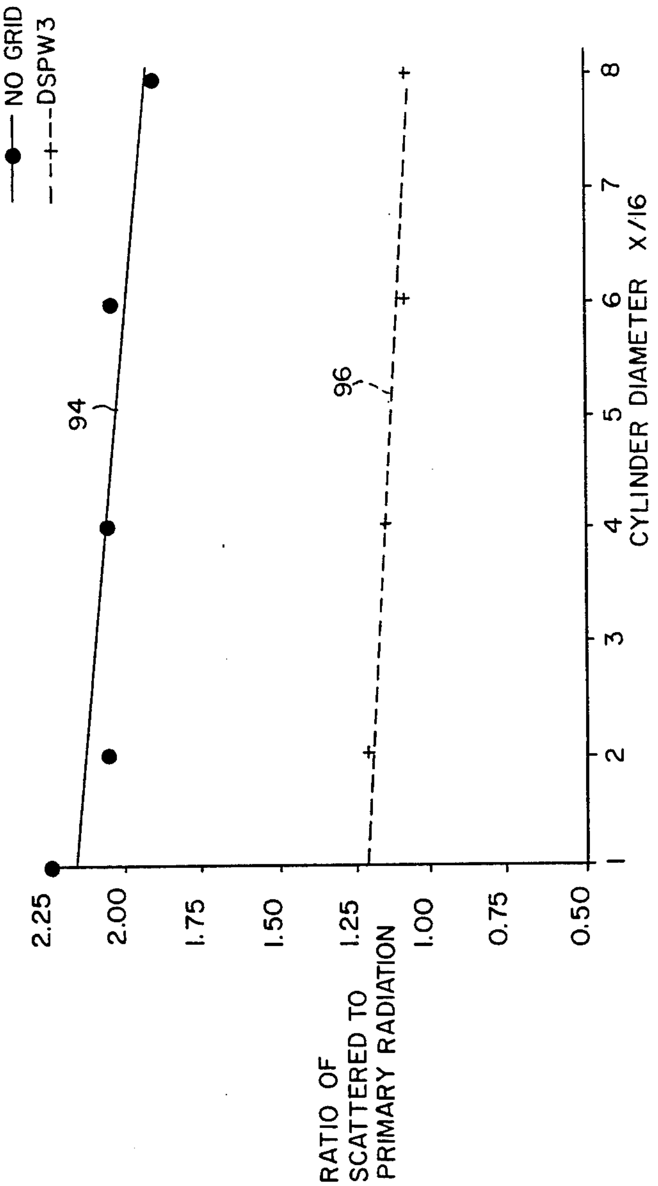
FIG. 13 is a graph showing experimental data gathered in comparative tests conducted on a stacked grid according to the present invention.

FIG. 12 shows how a lightweight stacked grid according to the present invention is used in a conventional x-ray cassette for bedside radiography. The cassette 82, having a cover 84, includes a lightweight stacked grid 86 and a front intensifying screen 88 attached to the cover. A rear intensifying screen 90 is attached to the bottom of the cassette 87. A sheet of x-ray film 92 is inserted in the cassette and the cassette is placed beneath a patient for exposure.

CONSTRUCTION OF AN EXAMPLE STACKED GRID

Using the electrochemical etching method described, a series of lines was etched into lead foil which was 0.002" thick and which was supported on a 0.004" thick polyester sheet. The lines, which were 0.0045" wide, were etched with 0.0075" spaces between them. A stacked grid was assembled from 4 layers of the etched material such that the layer spacings were 0.004", 0.004" and 0.007" respectively starting with the uppermost layer. The assembly was optically aligned.

The assembled grid was tested using a 4" thick Plexiglass block as a scatter-inducing phantom. Small lead cylinders having different diameters were placed on top of the phantom and radiographs taken without any grid and with the experimental grid. The ratio of scattered to primary radiation could than be computed using the densities of the areas under the cylinders in comparison with the overall density of the radiograph. The solid line 94 in FIG. 3 shows the ratio of the scattered to primary radiation for different diameter lead cylinders without the grid. The ratio of scattered to primary radiation with the grid is shown by the dashed line 96. The results clearly indicate the ability of the stacked grid to improve the ratio of scattered to primary radiation and thus the contrast of the resulting image.

INDUSTRIAL APPLICABILITY AND ADVANTAGES

The x-ray grids made according to the method of the present invention are useful in the filed of medical radiography. The method has the advantage that the grids are light in weight, flexible, and easily and inexpensively manufactured. The method has the further advantage than novel grids having unconventional geometries are easily constructed. For example, circularly symmetric two-dimensional collimating grids, and focused grids are readily produced. The lightweight grids produced by the method can also be usefully employed in an x-ray cassette.

We claim:

1. An x-ray collimating grid characterized by:

a plurality of grid patterns of x-ray opaque material formed on sheets of flexible x-ray transparent material, arranged in a stack such that the grid patterns are in alignment and spaced apart from one another.

2. The x-ray collimating grid claimed in claim 1, further characterized by said grid pattern spacing increasing geometrically from one sheet to the next.

3. The x-ray collimating grid claimed in claim 1, further characterized by said grid pattern comprising a two-dimensional pattern.

4. The x-ray collimating grid claimed in claim 3, wherein said two-dimensional pattern is a rectangular cross-hatch pattern.

5. The x-ray collimating grid claimed in claim 3, wherein said two-dimensional pattern is an array of circular apertures.

6. The x-ray collimating grid claimed in claim 3, wherein said two-dimensional pattern is an array of concentric circles.

7. The x-ray collimating grid claimed in claim 1, further characterized by said grid being a focused grid.

8. The x-ray collimating grid claimed in claim 7, further characterized by said focused grid having focusing properties in two directions.

9. The x-ray collimating grid claimed in claim 8, further characterized by said two-dimensional focused grid having sheets with patterns of concentric rings.

10. The x-ray collimating grid claimed in claim 8, further characterized by said two-dimensional focused grid having sheets with patterns of rectangular grids.

11. The x-ray collimating grid claimed in claim 8, further characterized by said two-dimensional focused grid having sheets with patterns of arrays of dots.

12. A method of making a grid for x-ray radiography, characterized by the steps of:

a. forming grid patterns of x-ray opaque material on a plurality of sheets of x-ray transparent material;

b. arranging said plurality of sheets in a stack such that said grid patterns are in alignment; and c. adhering said sheets together in said stack.

13. The method of making a grid for x-ray radiography claimed in claim 12, further characterized by spacing said sheets in geometrically increasing distance from one sheet to the next.

14. The method of making a grid for x-ray radiography claimed in claim 12, wherein said spacing is achieved by said sheets being of geometrically increasing thickness.

15. The method of making a grid for x-ray radiography claimed in claim 13, wherein said spacing is achieved by placing spacer sheets of x-ray transparent material between said sheets having said grid patterns.

16. The method of making a grid claimed in claim 12, wherein said step of forming grid patterns is performed by adhering a sheet of x-ray opaque material onto a sheet of x-ray transparent material, and patterning said x-ray opaque material by photolithography.

17. The method of making a grid claimed in claim 16, wherein said step of forming grid patterns is characterized by printing an x-ray opaque material in a binder on said x-ray transparent material.

18. The method of making a grid claimed in claim 12, wherein said x-ray transparent material is also optically transparent, and wherein said step of arranging said sheets in alignment is characterized by optically aligning said sheets.

19. The method of making a grid claimed in claim 12, wherein said step of arranging sheets in alignment is characterized by mechanically aligning said sheets.

20. An x-ray cassette incorporating an x-ray collimating grid having a plurality of grid patterns of x-ray opaque material formed on sheets of x-ray transparent material, arranged in a stack such that the grid patterns are in alignment and spaced apart from one another.

21. A method for making a medical radiograph including the step of positioning an x-ray collimating grid between the x-ray source and the x-ray sensitive recording medium, characterized by:

said x-ray collimating grid comprising a plurality of grid patterns of x-ray opaque material formed on sheets of flexible x-ray transparent material, arranged in a stack such that the patterns are spaced from one another.

22. The method for making a medical radiograph claimed in claim 21, further characterized by said grid patterns being spaced in geometrically increasing distances from one another.

23. The method of making a medical radiograph claimed in claim 21, further characterized by said x-ray collimating grid being a focused grid.

24. The method of making a medical radiograph claimed in claim 23, further characterized by said focused grid being a two-dimensional focused grid.

* * * * *